(12) United States Patent
Riquelme et al.

(10) Patent No.: US 11,813,696 B2
(45) Date of Patent: Nov. 14, 2023

(54) METHOD FOR JOINING TWO BLANKS AND BLANKS AND PRODUCTS OBTAINED

(71) Applicant: AUTOTECH ENGINEERING S.L., Amorebieta-Etxano (ES)

(72) Inventors: Antoine Riquelme, Sant Esteve Sesrovires (ES); Elisenda Vila I Ferrer, Sant Esteve Sesrovires (ES); Pedro Rubio Sánchez, Sant Esteve Sesrovires (ES); Mireia Illana Gregori, Sant Esteve Sesrovires (ES)

(73) Assignee: Autotech Engineering S.L., Vizcaya (ES)

( * ) Notice: Subject to any disclaimer, the term of this patent is extended or adjusted under 35 U.S.C. 154(b) by 861 days.

(21) Appl. No.: 16/637,120

(22) PCT Filed: Aug. 8, 2018

(86) PCT No.: PCT/EP2018/071442
§ 371 (c)(1),
(2) Date: Feb. 6, 2020

(87) PCT Pub. No.: WO2019/030249
PCT Pub. Date: Feb. 14, 2019

(65) Prior Publication Data
US 2020/0180077 A1 Jun. 11, 2020

(30) Foreign Application Priority Data
Aug. 9, 2017 (EP) ..................................... 17382563

(51) Int. Cl.
*B23K 26/322* (2014.01)
*B23K 26/044* (2014.01)
(Continued)

(52) U.S. Cl.
CPC ........ *B23K 26/322* (2013.01); *B23K 26/0093* (2013.01); *B23K 26/044* (2015.10);
(Continued)

(58) Field of Classification Search
CPC .......... B23K 2101/006; B23K 2103/10; B23K 31/125; B23K 26/24; B23K 26/073;
(Continued)

(56) References Cited

U.S. PATENT DOCUMENTS 5,571,430 A * 11/1996 Kawasaki ............ B23K 26/082
359/220.1
5,841,097 A * 11/1998 Esaka .................. B23K 26/067
219/121.64
(Continued)

FOREIGN PATENT DOCUMENTS

CN 106334875 A 1/2017
DE 102015106339 B4 2/2017
(Continued)

OTHER PUBLICATIONS

International Search Report for International Application No. PCT/EP2018/071442, dated Nov. 7, 2018.
(Continued)

*Primary Examiner* — Jimmy Chou
(74) *Attorney, Agent, or Firm* — Finnegan, Henderson, Farabow, Garrett & Dunner LLP

(57) ABSTRACT

The present invention relates to a method for joining a first blank and a second blank, wherein at least one of the first and second blanks comprises at least a layer of aluminum or an aluminum alloy. In particular, the method comprises placing the first and second blanks for welding; laser welding the first and second blanks following a welding path thus forming a tailor welded blank, wherein the welding path combines a linear movement along a welding direction and
(Continued)

oscillating movements substantially transverse to the welding direction and then hot deforming and quenching the tailor welded blank to form a component, wherein the welding is done without using a filler.

13 Claims, 7 Drawing Sheets

(51) Int. Cl.

| | | |
|---|---|---|
| *B23K 26/082* | (2014.01) | |
| *B23K 26/00* | (2014.01) | |
| *B23K 26/06* | (2014.01) | |
| *B23K 26/073* | (2006.01) | |
| *B23K 26/24* | (2014.01) | |
| *B23K 31/12* | (2006.01) | |
| *B23K 101/18* | (2006.01) | |
| *B23K 103/10* | (2006.01) | |
| *B23K 103/04* | (2006.01) | |
| *B23K 101/00* | (2006.01) | |

(52) U.S. Cl.
CPC ........ *B23K 26/0626* (2013.01); *B23K 26/073* (2013.01); *B23K 26/082* (2015.10); *B23K 26/24* (2013.01); *B23K 31/125* (2013.01); B23K 2101/006 (2018.08); B23K 2101/185 (2018.08); B23K 2103/04 (2018.08); *B23K 2103/10* (2018.08)

(58) Field of Classification Search
CPC ............ B23K 26/0626; B23K 26/0093; B23K 26/082; B23K 26/044; B23K 26/322
USPC .............................. 219/121.61, 121.64, 121.8
See application file for complete search history.

(56) References Cited

U.S. PATENT DOCUMENTS

| | | | | |
|---|---|---|---|---|
| 2009/0220815 A1* | 9/2009 | Canourgues | ............ | C22C 38/28 |
| | | | | 428/653 |
| 2011/0139753 A1* | 6/2011 | Lee | ...................... | B23K 26/244 |
| | | | | 219/121.64 |
| 2013/0087540 A1* | 4/2013 | Gu | ...................... | B23K 26/354 |
| | | | | 219/121.64 |
| 2014/0003860 A1* | 1/2014 | Evangelista | ........... | B23K 26/60 |
| | | | | 219/121.64 |
| 2014/0054273 A1* | 2/2014 | Behmlander | .......... | B23K 28/02 |
| | | | | 219/136 |
| 2014/0291304 A1* | 10/2014 | Mudd, II | ............... | B23K 26/32 |
| | | | | 219/121.64 |
| 2015/0043962 A1* | 2/2015 | Miyazaki | ............. | B23K 15/006 |
| | | | | 72/364 |
| 2016/0016261 A1* | 1/2016 | Mudd, II | ............. | B23K 26/242 |
| | | | | 219/121.64 |
| 2016/0045970 A1* | 2/2016 | Garcia | ................. | B23K 35/308 |
| | | | | 219/121.64 |
| 2016/0318127 A1* | 11/2016 | Gu | ...................... | B23K 26/244 |
| 2017/0173734 A1* | 6/2017 | Evangelista | ........... | B23K 9/235 |
| 2017/0232555 A1* | 8/2017 | Riquelme | ............. | B23K 26/26 |
| | | | | 219/121.64 |
| 2019/0240780 A1* | 8/2019 | Yang | .................... | B23K 26/244 |
| 2019/0299333 A1* | 10/2019 | Kokume | ............... | B23K 26/26 |

FOREIGN PATENT DOCUMENTS

| | | | | |
|---|---|---|---|---|
| ER | 2 832 887 A1 | 2/2015 | | |
| JP | H10-71480 A | 3/1998 | | |
| JP | 2013-204090 A | 10/2013 | | |
| WO | WO-2015192219 A1 * | 12/2015 | ........... | B23K 26/082 |
| WO | WO 2016/169791 A1 | 10/2016 | | |
| WO | WO 2017/103149 A1 | 6/2017 | | |
| WO | WO-2017109544 A1 * | 6/2017 | ............. | B23K 26/26 |

OTHER PUBLICATIONS

Written Opinion of the International Searching Authority for International Application No. PCT/EP2018/071442.

* cited by examiner

METHOD FOR JOINING TWO BLANKS AND BLANKS AND PRODUCTS OBTAINED

This application is a national stage filing under 35 U.S.C. § 371 of International Application No. PCT/EP2018/071442, filed on Aug. 8, 2018, which claims priority of European Patent Application No. 17382563.9, filed on Aug. 9, 2017. The contents of these applications are each incorporated herein by reference.

The present invention relates to a method for joining two blanks and to products obtained by or obtainable by said method. In particular, the present invention relates to a method for laser welding steel substrates having an aluminum or aluminum alloy coating.

BACKGROUND

The development of new materials and processes for the production of metal pieces with the aim of reducing component weight at a low cost is of utmost importance in the automotive industry. Typically in the automotive industry, high strength steel or Ultra High Strength Steel (UHSS) blanks are used for manufacturing components of a structural skeleton. The structural skeleton of a vehicle, e.g. a car, in this sense may include e.g. a bumper, pillars (A-pillar, B-pillar, C-pillar), side impact beams, a rocker panel, and shock absorbers.

In order to achieve these objectives, the industry has developed Ultra High Strength Steels (UHSS), which exhibit an optimized maximal strength per weight unit and advantageous formability properties. UHSS may have an ultimate tensile strength of at least 1000 MPa, preferably approximately 1500 MPa or up to 2000 MPa or more.

Some of these steels are designed to attain a microstructure after heat treatment, which confers good mechanical properties and makes them especially suited for the hot stamping process used to form steel blanks into particular automobile parts. Since during the hot stamping process the blank is subjected to aggressive atmospheres, the steel is usually coated to avoid corrosion and oxidation.

In an attempt to minimize the weight of components while respecting structural requirements, so-called "tailored blank" techniques may be used. In these techniques, components may be made of a composite metal blank which is obtained by welding several blanks with different thicknesses, size and properties. At least theoretically, using this kind of technique the use of material may be optimized.

Blanks of different thickness may be joined or a steel blank may be joined with a coated steel blank for example, using the specific properties of each material where they are needed.

In order to avoid the decarburization and the scale formation during the forming process, 22MnB5 is presented with an aluminum-silicon coating. The composition of 22MnB5 is summarized below in weight percentages (rest is iron (Fe) and impurities):

| C  | 0.20-0.25   |
|----|-------------|
| Si | 0.15-1.35   |
| Mn | 1.10-1.25   |
| P  | <0.025      |
| S  | <0.008      |
| Cr | 0.15-0.30   |
| Ti | 0.02-0.05   |
| B  | 0.002-0.004 |
| N  | <0.009      |

Several 22MnB5 steels are commercially available having a similar chemical composition. However, the exact amount of each of the components in a 22MnB5 steel may vary slightly from one manufacturer to another.

Usibor® 1500P is supplied in ferritic-perlitic phase. It is a fine grain structure distributed in a homogenous pattern. The mechanical properties are related to this structure. After heating, a hot stamping process, and subsequent quenching, a martensite microstructure is created. As a result, maximal strength and yield strength increase noticeably.

The composition of Usibor® 1500P is summarized below in weight percentages (rest is iron (Fe) and unavoidable impurities):

| C    | Si   | Mn   | P     | S     | Cr   | Ti    | B     | N     |
|------|------|------|-------|-------|------|-------|-------|-------|
| 0.24 | 0.27 | 1.14 | 0.015 | 0.001 | 0.17 | 0.036 | 0.003 | 0.004 |

As mentioned before, Usibor® 1500P is supplied with an aluminum-silicon (AlSi) coating in order to prevent corrosion and oxidation damage. However, this coating has a significant downside related to its weld behavior. If Usibor® 1500P blanks are welded without any further measures, aluminum of the coating may enter into the weld area and this can cause an important reduction of the mechanical properties of the resulting component and increase the possibility of weak fracture in the weld zone.

The presence of aluminum in the welding seam avoids the creation of martensite in a further hot deforming process. Additionally, a high aluminum concentration leads to the creation of intermetallics. Such intermetallics are generally brittle which implies a weaker weld and after a hot deformation process such as, hot stamping, intermetallics may lead to a weaker joint. If no measures are taken, the ultimate tensile strength of the weld may decrease from e.g. 1500 MPa to e.g. 900 MPa which may lead to localized rupture in the welding area when the resulting component is subjected to a bending load (e.g. an impact).

In order to overcome this type of problems, a method was proposed in WO 2007/118939 which consists in removing (e.g. by laser ablation) a part of the coating in an area close to the welding gap. This method has the disadvantage that an additional step is needed for the production of the (tailored) blanks and components and that in spite of the repetitive nature of the process, this additional step requires a complex quality process with an elevated number of parts which are to be scrapped. This entails an increase of the cost of the welding step and limits the competitiveness of the technology in the industry.

US 2008/0011720 proposes a process for laser welding at least one metal workpiece by a laser beam, said workpiece having a surface containing aluminum, characterized in that the laser beam is combined with at least one electric arc to melt the metal and weld said workpiece(s). The laser in front of the arc allows the use of a flux-cored wire or the like containing elements inducing the gamma-phase (Mn, Ni, Cu, etc,) favourable to maintaining an austenitic structure throughout the melted zone.

However, problems related to the only partial dilution of the filler materials along the depth of the welding zone have been found which result in a reduced welding strength. Furthermore, the filler material may not distribute homogeneously in the welding zone. This may cause material accumulation ("bumps") in certain areas thus affecting locally the behaviour of the welding zone. That is, the mechanical properties of the welding zone may vary.

Another problem may be that the filler material may need to be preheated before applied because the electric arc may not be capable of melting it otherwise.

In conclusion, there is still a need for providing methods to obtain a strengthened weld, which avoids or at least reduces some of the aforementioned problems.

Throughout the present invention, a blank may be regarded as an article that has yet to undergo one or more processing steps (e.g. deformation, machining, surface treatment or other). These articles may be substantially flat plates or have more complicated shapes.

SUMMARY

In a first aspect of the present invention, there is provided a method for joining a first blank and a second blank, wherein at least one of the first and second blanks comprises at least a layer of aluminum or an aluminum alloy, the method comprising:
 placing the first and second blanks for welding;
 laser welding the first and second blanks following a welding path, and
 hot deforming and quenching the welded blanks to form a component,
wherein the welding path combines a linear movement along a welding direction and oscillating movements substantially transverse to the welding direction, wherein the welding is done without using a filler.

According to this aspect, aluminum may be present in the weld zone, but it does not lead to worse mechanical properties after hot deformation processes such as hot stamping. The tensile strength of the weld zone may be of the same level as adjacent portions of the resulting component. The oscillating movements of sufficient frequency lead to a dilution of the aluminum throughout the weld zone, such that the concentration of aluminum locally is so low that it does not lead to intermetallic parts, nor does it avoid the formation of martensite in a classic hot deforming and quenching process.

There is thus no need to remove completely or partially an aluminum or aluminum alloy layer, such as was proposed in some prior art methods, when coated steel blanks are to be welded. In this way, the process of welding two blanks is carried out in a quicker and cheaper manner since an intermediate process step of removing the coated layer is not necessary. On the other hand, since there is no need to add any filler in the welded zone, all disadvantages related to a high velocity gas flow with a filler material are avoided Typically, the joining type of the first blank and the second blank is selected from the group consisting of an edge-to-edge butt joining, an overlap joining and a lap joining, preferably an edge-to-edge butt joining.

It is to be understood that the term edge-to edge butt joints refers to the case where the narrow surface of one piece is joined to the narrow surface of the other piece (see FIG. 1c). This edge-to-edge (or butt joint or edge-to-edge butt joint) configuration is typically used for obtaining a tailor welded blank.

Typically, the first blank and/or the second blank comprises a steel substrate with a coating comprising the layer of aluminum or of an aluminum alloy wherein said steel substrate is preferably an ultra high strength steel.

In a preferred embodiment of the present invention, the oscillating movements of the welding path follow a substantially circular loop pattern or alternatively are reciprocating linear movements. Examples of patterns following a reciprocating linear movement are, but not limited to, zigzag and sinusoidal patterns.

Typically, the oscillating movement of the welding path has a frequency between 400-1500 Hz, preferably between 600-1200 Hz, being more preferable in the range of 700 and 1000 Hz.

Typically, the welding path has a width between 0.5-10 mm, preferably between 0.5-5 mm, more preferable between 0.5-3 mm, being the most preferable between 0.8-2 mm. In some examples, a welding path with a width between 0.8-1.2 mm is preferred.

The spot of the laser beam may be of any shape, such as circular, and its size may be ranging from 0.2 mm to 1 mm, preferably ranging from 0.5 mm to 1 mm.

In another embodiment of the present invention, the laser beam has a maximum power ranging from 0.5 kW to 10 kW, preferably from 3 kW to 6 kW. In an advantageous embodiment, a maximum power of 4 kW is used. A protector gas, such as, argon or helium, may also be used to avoid rusting.

In some cases, the power of the laser beam may be dynamically controlled during the oscillating movement of the laser beam, in particular, the power of the laser beam can be adjusted in those small areas where the laser is used more than one pass or in those spot areas where the laser direction suddenly changes to form the oscillating movement. The advantageous effect of this dynamic control of the power of the laser beam is the possibility to adapt the power during the welding process along the welding path depending on the particular characteristics of the blanks to be welded.

Depending on the pattern type of the oscillating movement described by the laser beam and/or on the width of the laser spot, some areas of the welding zone may be subjected to the application of the laser beam during more time or are subjected to more than one pass than other areas. In this regard, the power of the laser beam applied can be adjusted during the welding process in order, for example, to avoid an overheating of these mentioned areas that are specially exposed to the laser beam either during more time than the other areas or where the laser beam is applied more than one pass when compared with other areas.

In other embodiments, in particular where two blanks with different thicknesses are to be welded together, the power of the laser beam applied can be adjusted during the welding process, in such way that the maximum power of the laser beam is applied on the thicker blank while the same laser beam is then adjusted to a lower power and thus applied on the thinner blank.

Similarly, the dynamic control of the power of the laser beam can also be applied in cases, where the blanks to be welded have different coating thicknesses. In this case, it is also preferred to apply the dynamic control of the power of the laser beam by using the maximum power of the laser beam on the blank having a thicker coating while adjusting the lower power of the laser beam on the blank having a thinner thickness.

It has been surprisingly found that the best results for obtaining a welded blank component using the dynamically controlled laser power during the oscillating welding process of the present invention are achieved when the lower power of the laser beam used is ranging from 10 to 50%, preferably from 15 to 45% of the maximum power. This lower power can also be called as a minimum power. For example, by applying the minimum power of 10 to 50% of the maximum power into the small areas where the laser beam is applied more than one pass, the overheating of said small area is avoided, aluminum is correctly mixed in the welding area, thus avoiding the formation of ferrite inclusions in the welding zone.

Typically, the linear movement along the welding direction is conducted by the laser beam at a rate ranging from 1 to 10 m/min, preferably from 2 to 8 m/min and more preferably from 3 to 5 m/min. In an advantageous embodiment, the linear movement along the welding direction is conducted by the laser beam at a rate of 4 m/mm.

The oscillating movement is selected in a such way that the aluminum amount present in the coating is sufficiently diluted in the weld zone and thus the average weight concentration of aluminum should be always below than 5%, preferably below than 3%, more preferably below than 1%.

The method of the present invention may be used for forming, for example, tailored blanks by butt joining two blanks. One of the blanks or both blanks may comprise a steel substrate with a coating comprising a layer of aluminum or an aluminum alloy. The tailor welded blank (TWB) technique is used to adapt the properties of a component locally. In tailor welded blank technique, blanks of different thicknesses or different materials may be joined.

A typical butt joining configuration for welding together two blanks with different thicknesses consist of positioning both blanks in such a way that their bases (lower surfaces) are placed in the same geometric plane, both blanks being in contact by one of their edges. When using a butt joining configuration, the laser beam moves following the welding direction, while being perpendicular to the surface of both blanks to be welded.

BRIEF DESCRIPTION OF THE DRAWINGS

Non-limiting examples of the present disclosure will be described in the following, with reference to the appended drawings, in which.

DETAILED DESCRIPTION

Figure 1A:
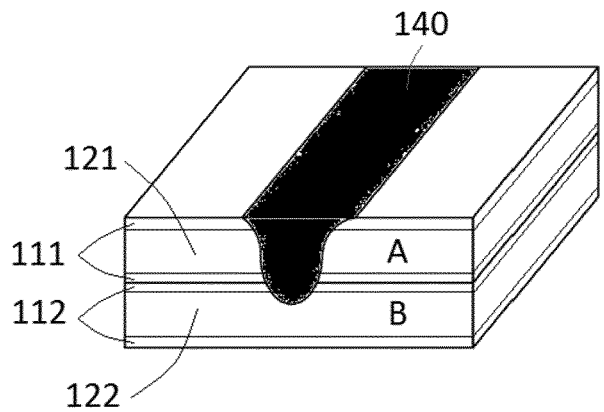
FIGS. 1a, 1b and 1c illustrate three different configurations for joining two blanks.
Figure 1B:
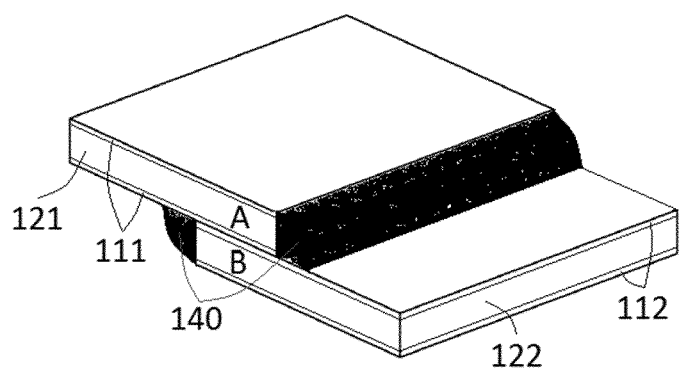
Figure 1C:
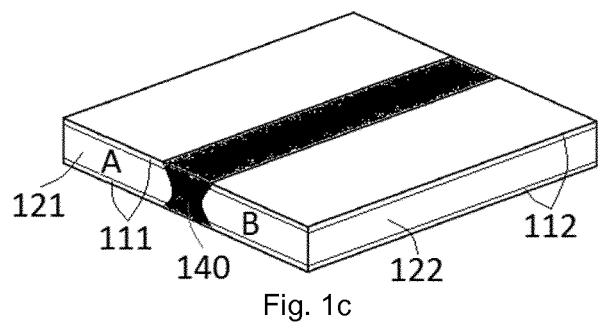

FIGS. 1a, 1b and 1c illustrates three different configurations for joining a first blank A having a steel substrate 121 and a coating 111 with a second blank B having a steel substrate 122 and a coating 112.

FIG. 1a illustrates an example of a method for joining a first blank A with a second blank B in an overlap joining configuration, i.e., placing the first blank A over the second blank B. The laser beam is applied on the external surface of the first blank A and the region of the blank A, where the laser beam is applied, is melted in its entire thickness (140), while the region of the second blank B reached by laser is not necessarily melted across its whole thickness (140).

FIG. 1b depicts an example of a method for joining a first blank A with a second blank B in a lap joining configuration, i.e., placing the first blank A over the second blank B, being the first blank A at least partially slid with respect to the second blank B. The laser beam is applied on the contact zone (140) between both blanks that is accessible from the outside for the laser device.

FIG. 1c shows an example of a method for joining a first blank A with a second blank B in an edge-to-edge configuration (also known as "butt-joining" or "edge-to-edge butt-joining"). The edge-to-edge welding consists in placing the first blank A besides the second blank B in such a way that both blanks are in contact by their lateral sections and applying the laser beam over the junction between both blanks (140).

Figure 2:
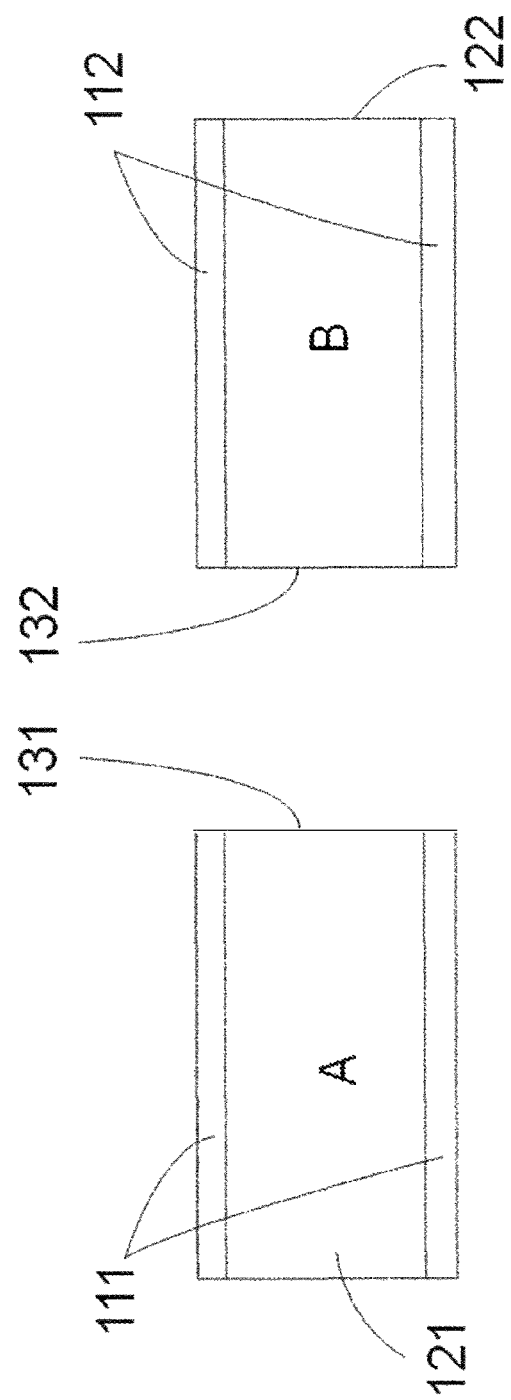
FIG. 2 illustrates a preferred example of joining two blanks.

FIG. 2 illustrates a preferred example of a method for joining a first blank A with a second blank B. A first region 131 of the first blank A is to be joined to a second portion or region 132 of the second blank B. In this example, the two blanks A, B are to be butt-jointed, i.e. an edge-to-edge welding.

In the example of FIG. 2, both first blank A and second blank B may be a coated UHSS substrate, for example a coated 22MnB5 steel substrate such as e.g. Usibor® 1500 P. Both blanks thus comprise a steel substrate 121, 122 on which a coating layer 111, 112 may be provided. The coating applied may be aluminum or aluminum alloy, such as, aluminum-silicon. FIG. 2 shows a single coating layer 111, 112. However, a plurality of coating layers may also be used. The coating is provided on both a top and a bottom surface of the steel substrate.

Figure 3:
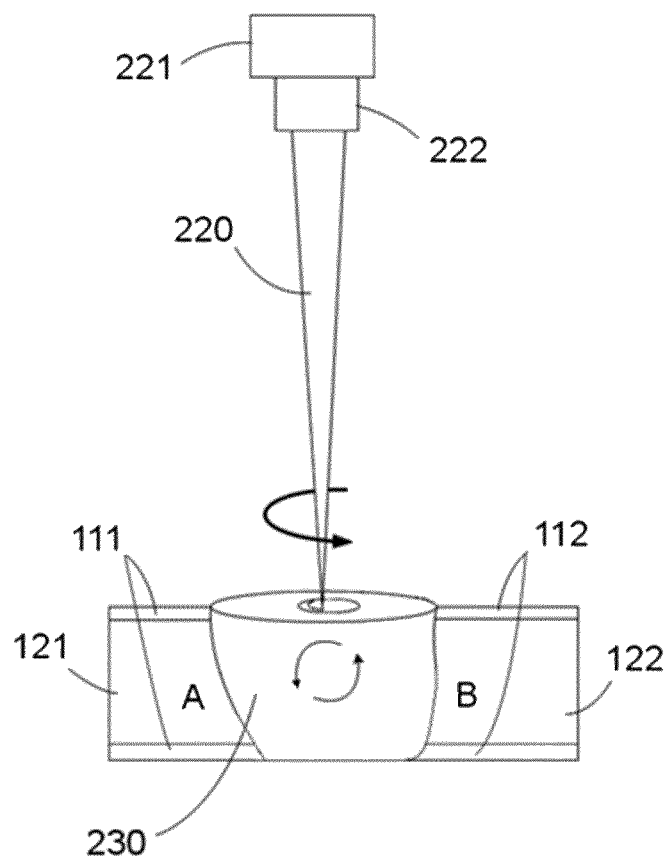
FIG. 3 illustrates an example of laser beam welding two blanks.

FIG. 3 illustrates a cross section view of a laser weld device 221 having a laser head 222 from which a laser beam 220 exits. The laser beam 220 is able to melt regions 131, 132 of the blanks A, B (see FIG. 2) in a weld pool 230. In this example, the regions of the blanks 131, 132 are melted throughout their entire thickness. In this regard, the steel substrate materials 121, 122 as well as the coating material of the coating layers 111, 112 are altogether mixed in the weld pool 230.

Usually, the spot of the laser beam may be of any shape, such as, circular. The spot size, also called beam diameter, may be ranging from 0.2 mm to 1 mm, preferably ranging from 0.5 mm to 1 mm.

The laser beam has an maximum power ranging from 0.5 to 10 kW, preferably from 3 kW to 6 kW. A protector gas, such as, argon or helium, may also be used to avoid rusting of the surface of the blanks, especially of the welded region.

Figure 4:
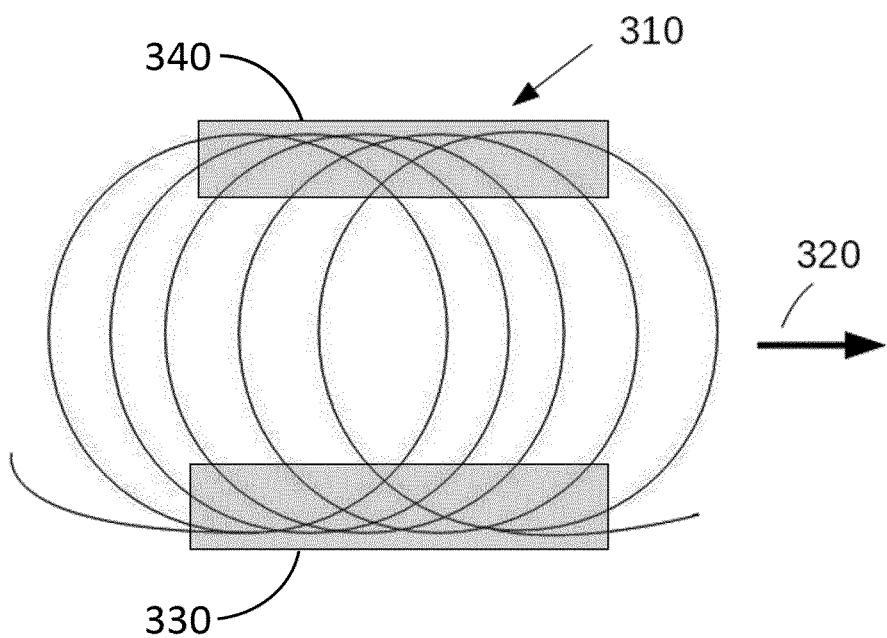
FIGS. 4 and 5 illustrate a welding path pattern according to some examples of the present invention.

FIG. 4 shows a top view of an example of a welding pattern 310 that follows a welding direction 320 which is parallel to the edge-to-edge joint. The welding pattern 310 in this example comprises a combination of a substantially linear movement along the weld direction, i.e. following a weld seam; and oscillating movements that are substantially perpendicular to the weld direction. In this example, a substantially circular loop i.e. with an eccentricity close to 0 is repeated with a predetermined frequency and such a movement is performed superimposed on the linear movement along the weld direction. However, elliptical loops i.e. with an eccentricity between 0 and 1, or other non-linear patterns may also be used.

As mentioned above, in order to avoid any undesired overheating specially of the areas (330, 340), where the laser beam is applied more time, the laser power beam is dynamically controlled during the oscillating welding process. A lower power of the laser beam of 20 to 45% of the maximum power of the laser beam is used. In this case, a homogeneous hardness profile without the presence of ferritic inclusions in the weld is obtained thus enhancing the quality of the welded area.

The frequency of the welding pattern may be between 400 and 1500 Hz, preferably between 600 and 1200 Hz, and more preferably between 700 and 1000 Hz. In other words, the laser beam oscillates along the welding pattern at a frequency of 400 to 1500 Hz, preferably at 600 to 1200 Hz, and more preferably at 700 to 1000 Hz. The particular range of frequency between 700 and 800 Hz has been found particularly advantageous. At the same time the laser beam moves linearly in the direction of the welding pattern at a rate ranging from 1 to 10 m/min, preferably at a rate ranging from 2 to 8 m/min.

It has been found that welding patterns with high frequencies are able to dilute the aluminum throughout the weld zone in such a way that average weight concentrations of aluminum throughout the weld zone is always below 5% in particular below 3%, more particularly below 1% It has been found that the resultant strength of the weld zone after hot deforming die quenching is improved if the presence of aluminum in the intermetallic layers can be avoided while the amount of aluminum in the external layer is minimised.

The low aluminum concentration in the welding seam would not be able to create intermetallic compounds, and therefore the weld zone would not be weakened.

Therefore, when implementing a linear and oscillating welding path pattern according to the present invention, there is no need for removing the aluminum layer coating 111, 112 of the blanks A, B prior to welding. Neither partial, nor full ablation is needed. The manufacture of hot formed components can be simplified and thus leading to cost reduction and faster operation.

Figure 5:
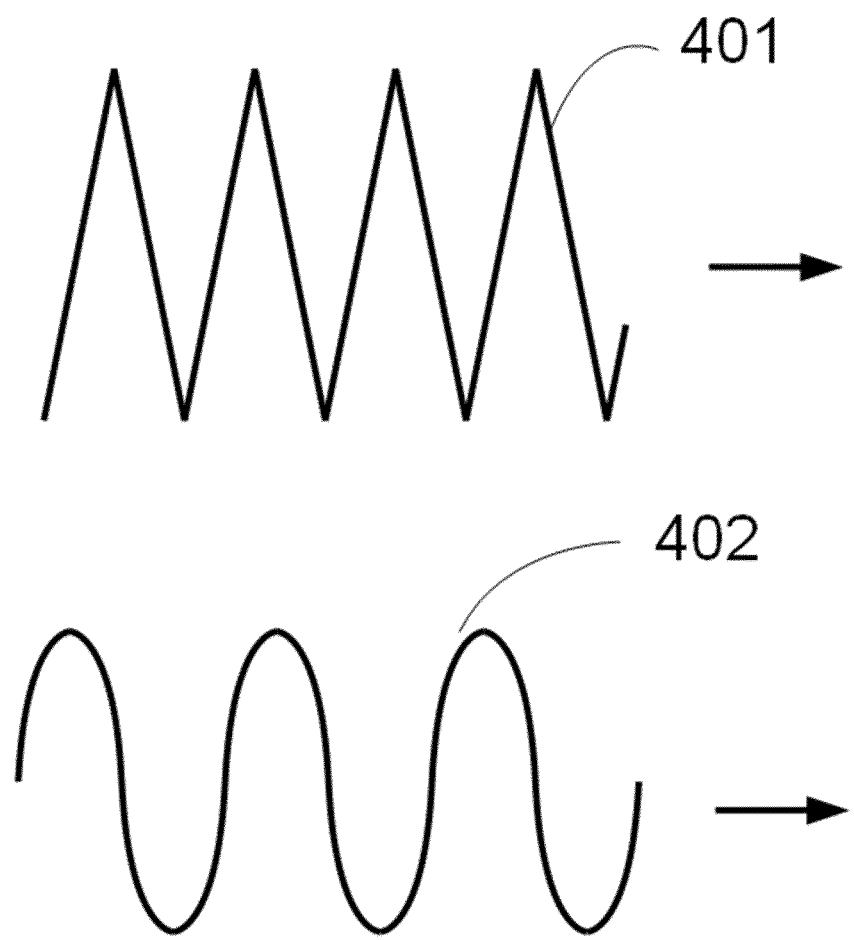

FIG. 5 shows a top view of alternative welding patterns 401, 402 that follow a welding direction indicated by the arrows. The welding pattern 401 illustrates a zigzag pattern while the welding pattern 402 shows a sinusoidal shape. The frequency of both welding patterns 401, 402 may be varied so as to create a weld without high aluminum concentration while at the same time having the required strength. In this case, the use of a dynamically controlled laser beam is preferred for the same reasons as mentioned above.

Figure 6:
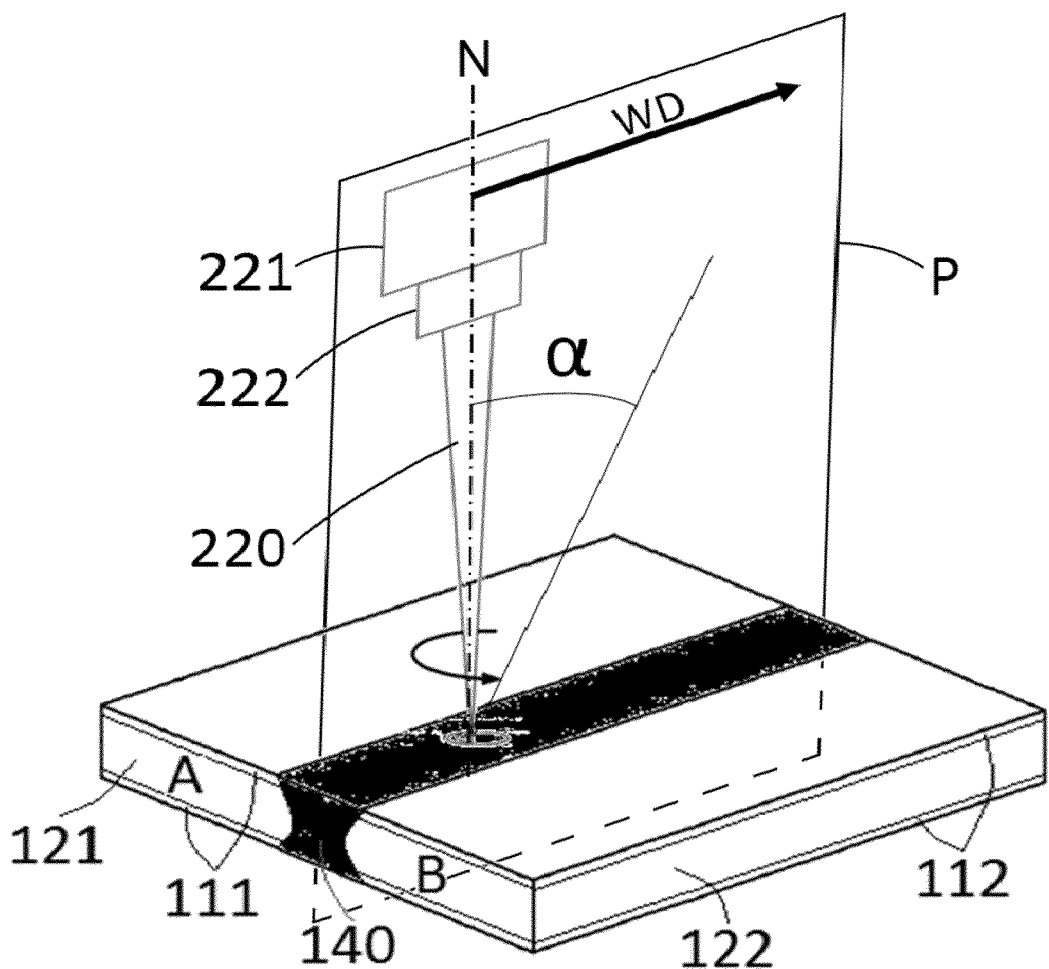
FIG. 6 illustrates an example of laser beam welding two blanks according to another example of the present invention.

FIG. 6 shows an alternative embodiment of the method of the present invention. In this case, the laser beam may be alternatively applied following the welding direction arrow (WD) within the median cross section plane (P) and forming an angle α with respect to the normal direction (N) which is perpendicular to the surface of the welded blanks. It has been found that this inclination of the laser beam is particularly advantageous, especially where the two blanks to be welded and/or the coating thereof have different thicknesses. Typically the angle α may be ranging from 0 to 70 degree, preferably from 10 to 50 degree, with respect to the normal direction (N).

Figure 7:
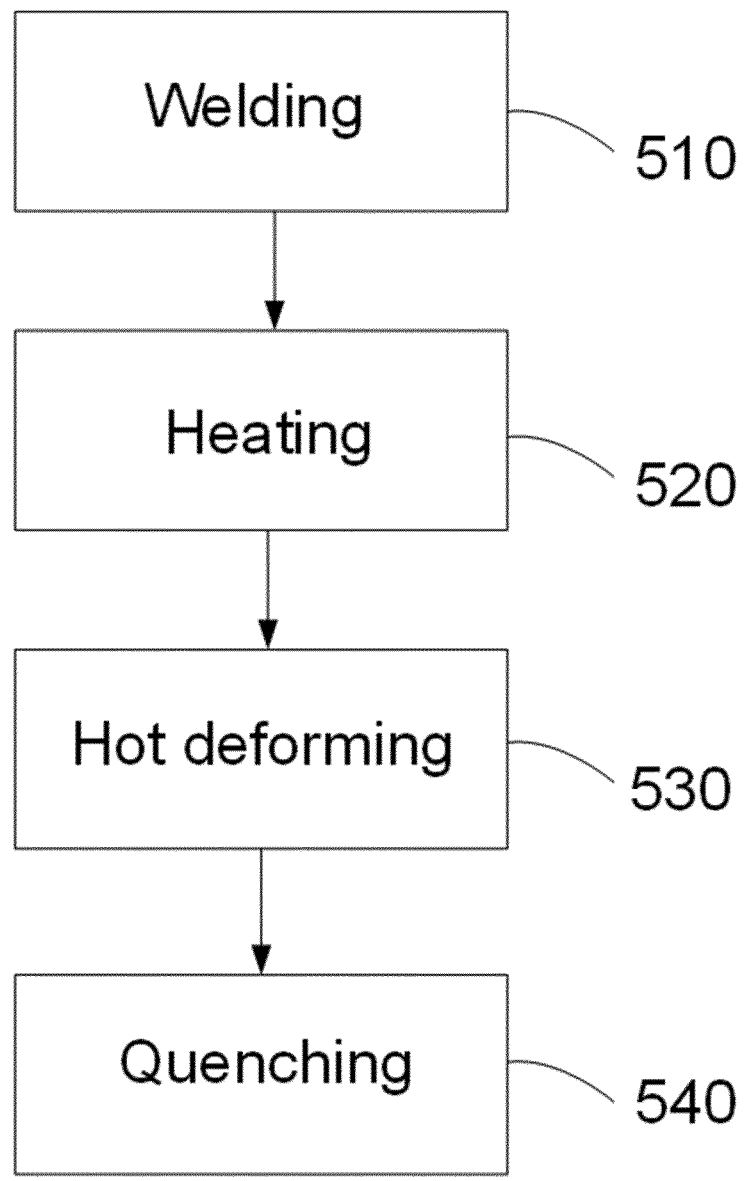
FIG. 7 illustrates a flow diagram of a method for forming a product.

FIG. 7 shows a flow diagram of a process according to the present invention to obtain a final hot-stamped and die quenched product. First of all a welding process 510 according to any of the examples disclosed herein may be used to weld a first blank A and a second blank B. The resulting welded blank may be heated 520 in, for example, a furnace to about its austenizing temperature. Then, the blank may be hot deformed 530, for example, hot stamped, to form a component having a specific geometrical configuration, such as, a B-pillar component. After the hot deformation process, the blank may be quenched 540 to obtain a martensite microstructure which gives satisfactory mechanical characteristics, in particular in the welded zone of the welded blank.

Although only a number of examples have been disclosed herein, other alternatives, modifications, uses and/or equivalents thereof are possible. Furthermore, all possible combinations of the described examples are also covered. Thus, the scope of the present disclosure should not be limited by particular examples, but should be determined only by a fair reading of the claims that follow.

The invention claimed is:

1. A method for joining a first blank and a second blank, wherein at least one of the first and second blanks comprises at least a layer of aluminum or an aluminum alloy, the method comprising:
   placing the first and second blanks for welding,
   laser welding the first and second blanks following a welding path, and
   hot deforming and quenching the welded blanks to form a component, wherein:
   the welding path combines a linear movement along a welding direction and oscillating movements substantially transverse to the welding direction, wherein the welding is done without using a filler, and
   the oscillating movements of the welding path follow a continuous multiple circular loop pattern, advancing in the welding direction.

2. The method according to claim 1, wherein the joining of the first blank and the second blank is selected from the group consisting of an edge-to edge butt-joining, an overlap joining, or a lap joining.

3. The method according to claim 2, wherein the joining of the first blank and the second blank comprises an edge-to edge butt-joining to form a tailor welded blank.

4. The method according to claim 1, wherein at least one of the first blank or the second blank comprises a steel substrate with a coating comprising the layer of aluminum or of an aluminum alloy, and wherein said steel substrate comprises an ultra high strength steel.

5. The method according to claim 1, wherein the oscillating movement has a frequency between 400 Hz and 1500 Hz.

6. The method according to claim 5, wherein the oscillating movement has a frequency between 700 Hz and 1000 Hz.

7. The method according to claim 1, wherein the welding path has a width between 0.5 mm and 10 mm.

8. The method according to claim 1, wherein the laser beam has a spot size ranging from 0.2 mm to 1 mm.

9. The method according to claim 1, wherein the laser beam has a maximum power ranging from 0.5 kW to 10 kW.

10. The method according to claim 1, wherein the power of the laser beam is dynamically controlled during the oscillating movement, and wherein a minimum power of between 10% and 50% of the maximum power is used.

11. The method according to claim 1, wherein the linear movement along the welding direction is conducted by the laser at a rate ranging from 1 m/min to 10 m/min.

12. The method according to claim 1, wherein the welded zone has substantially the same tensile strength as adjacent portions of the component.

13. The method according to claim 1, wherein the aluminum coating is not completely or partially removed prior to welding.

* * * * *